US010375886B2

(12) United States Patent
Hine

(10) Patent No.: US 10,375,886 B2
(45) Date of Patent: Aug. 13, 2019

(54) TURF BLADE LIFTING ASSEMBLY

(71) Applicant: Rodney Hine, Scituate, MA (US)

(72) Inventor: Rodney Hine, Scituate, MA (US)

( * ) Notice: Subject to any disclaimer, the term of this patent is extended or adjusted under 35 U.S.C. 154(b) by 70 days.

(21) Appl. No.: 15/636,757

(22) Filed: Jun. 29, 2017

(65) Prior Publication Data
US 2018/0000012 A1    Jan. 4, 2018

Related U.S. Application Data

(60) Provisional application No. 62/356,585, filed on Jun. 30, 2016.

(51) Int. Cl.
| A01D 43/00 | (2006.01) |
| A01D 43/02 | (2006.01) |
| A01D 34/47 | (2006.01) |
| A01D 43/063 | (2006.01) |
| A01D 34/54 | (2006.01) |
| A01D 34/62 | (2006.01) |
| A01D 101/00 | (2006.01) |

(52) U.S. Cl.
CPC ............ *A01D 43/02* (2013.01); *A01D 34/47* (2013.01); *A01D 34/54* (2013.01); *A01D 34/62* (2013.01); *A01D 43/063* (2013.01); *A01D 2101/00* (2013.01)

(58) Field of Classification Search
CPC ........ A01B 45/00; A01D 7/10; A01D 34/001; A01D 34/67; A01D 34/82; A01D 34/47; A01D 34/54; A01D 34/62; A01D 34/63; A01D 43/02; A01D 57/01; A01D 43/063
USPC ................ 56/14.7, 14.9, 17.3, 16.1; 172/393
See application file for complete search history.

(56) References Cited

U.S. PATENT DOCUMENTS

| 2,042,405 | A | * | 5/1936 | Knudson | E01C 23/082 |
| | | | | | 172/189 |
| 4,151,701 | A | * | 5/1979 | Marto | A01D 7/10 |
| | | | | | 172/393 |
| 4,989,676 | A | * | 2/1991 | Rogers | A01D 42/06 |
| | | | | | 111/197 |
| 5,018,587 | A | * | 5/1991 | Gandrud | E01H 1/02 |
| | | | | | 172/445.1 |
| 5,477,927 | A | * | 12/1995 | Figura | A01B 45/02 |
| | | | | | 172/29 |
| 7,069,711 | B1 | * | 7/2006 | Connell | A01B 45/00 |
| | | | | | 56/16.7 |
| 8,001,753 | B2 | * | 8/2011 | Franco | A01D 43/02 |
| | | | | | 172/811 |
| 8,839,878 | B2 | * | 9/2014 | Tozer | E01H 1/12 |
| | | | | | 15/78 |
| 9,545,050 | B2 | * | 1/2017 | Fichera | A01D 34/001 |

(Continued)

FOREIGN PATENT DOCUMENTS

| FR | 2986714 | * | 2/2012 |
| GB | 2157533 | * | 10/1985 |

*Primary Examiner* — Robert E Pezzuto
(74) *Attorney, Agent, or Firm* — John M. Brandt

(57) ABSTRACT

A turf blade lifting assembly comprising a flexible mat composed of, for example, artificial or synthetic turf, the fibers of which are of relatively short height and are configured to commingle with natural turf; and an attachment apparatus for mounting the mat on the front of a mowing machine which mat is thereby positioned to be dragged along the turf surface prior to cutting to achieve the upright orientation of the turf blades to create a thick and uniform result for the subject area.

18 Claims, 5 Drawing Sheets

(56) References Cited

U.S. PATENT DOCUMENTS

| | | | |
|---|---|---|---|
| 2006/0123760 A1* | 6/2006 | Glasscock | A01D 34/67 56/17.3 |
| 2006/0236670 A1* | 10/2006 | Glasford | A01D 43/02 56/257 |
| 2010/0313537 A1* | 12/2010 | Lundberg | A01B 45/00 56/14.9 |
| 2014/0331628 A1* | 11/2014 | Fichera | A01D 34/001 56/10.1 |

\* cited by examiner

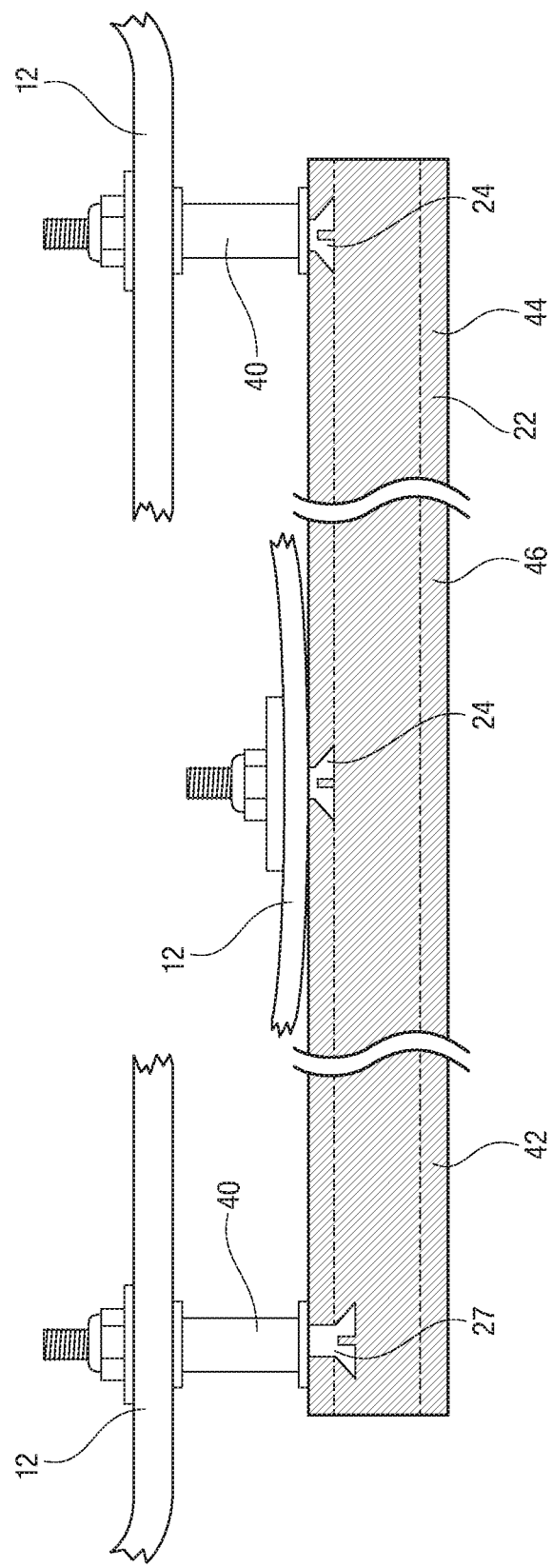

US 10,375,886 B2

TURF BLADE LIFTING ASSEMBLY

CROSS REFERENCE TO RELATED APPLICATIONS

This application is based on the disclosure of U.S. Provisional Application No. 62,356,585 filed Jun. 30, 2016 by the same inventor which is herein incorporated by reference.

BACKGROUND OF THE INVENTION

Field of the Invention

The invention resides in the field of sports playing field turf maintenance and more particularly relates to turf blade lifting devices for raising or straightening depressed turf blades prior to cutting by a mowing machine.

Description of the Prior Art

This invention is designed to lift the blades of a patch of natural turf or grass in preparation for cutting by a mowing machine, for example, a reel type power mower used in maintaining a highly groomed portion of a grassy field such as a golf green.

Reel mowers, also called cylinder mowers, familiar as the hand-pushed or self-powered cylinder lawn mower, have a horizontally rotating cylindrical reel composed of helical blades, each of which in turn runs past a horizontal cutter-bar, producing a continuous scissor action. The bar is held at an adjustable level just above the ground and the reel runs at a speed dependent on the forward movement speed of a machine driven by a rotational support, for example, wheels or drums running on the ground, or in self-powered applications, by a motor. The cut grass is most often gathered in a collection bin or receptacle.

Golf greens in particular are an example of a sport playing field that receive heavy use, i.e., foot traffic, which mats down sections of the green requiring special attention to lift bent blades prior to cutting as much toward the vertical as possible. A great variety of devices particularly designed or suitable for this task exist in the prior art and include, for example, rake, vacuum, and brush arrangements. Most of these appear as rather complex complicated designs requiring care and adjustment so as not to damage the turf or inadequately prepare it prior to cutting.

Examples include U.S. Pat. No. 5,018,587, Grandrud et al., disclosing a plate attachment for mounting a plurality of upright brushes; U.S. Pat. No. 5,974,771, Greenan, showing a cylindrical rotating rake; and U.S. Pat. No. 7,069,711, Connell et al., illustrating a brush front mounted on a greens mower. Also US patent published application 2006/0123760, Glasscock, discloses a rigidly front mounted pair of brushes; and US patent published application 2006/0277714, Dunning et al, describes a vacuum powered lawn debris collection apparatus.

In contrast, the present invention, in comparison to the prior art, is much less complicated in structure, more efficient in preparing an area of turf to be cut, more easily attached, less likely to damage the turf, and substantially less expensive to manufacture.

SUMMARY OF THE INVENTION

The invention may be summarized as a turf blade lifting assembly comprising a flexible mat having a flexible back and a surface composed of a plurality of flexible fibers attached thereto. An example of such a mat is one employing artificial or synthetic turf, the fibers of which are of relatively short height and are configured to commingle with natural turf. Additionally, means are provided for mounting the mat on the front of a mowing machine which mat will thereby be positioned to be dragged along the turf surface prior to cutting to achieve the upright orientation of the turf blades to create a thick and uniform result for the subject area.

In a preferred embodiment, the mat is shown removeably attached to a grass catching receptacle disposed on the forward end of a particular reel type golf greens maintenance mower. However, it will be seen and understood from the description and drawings below that the novel combination disclosed herein is applicable to other mowers and may use other mats with fibers configured and arranged to commingle with natural turf blades other than artificial or synthetic turf.

DESCRIPTION OF THE DRAWINGS

FIG. 5 is a top view of the component of FIG. 4.

DESCRIPTION OF THE PREFERRED EMBODIMENT

Figure 1:
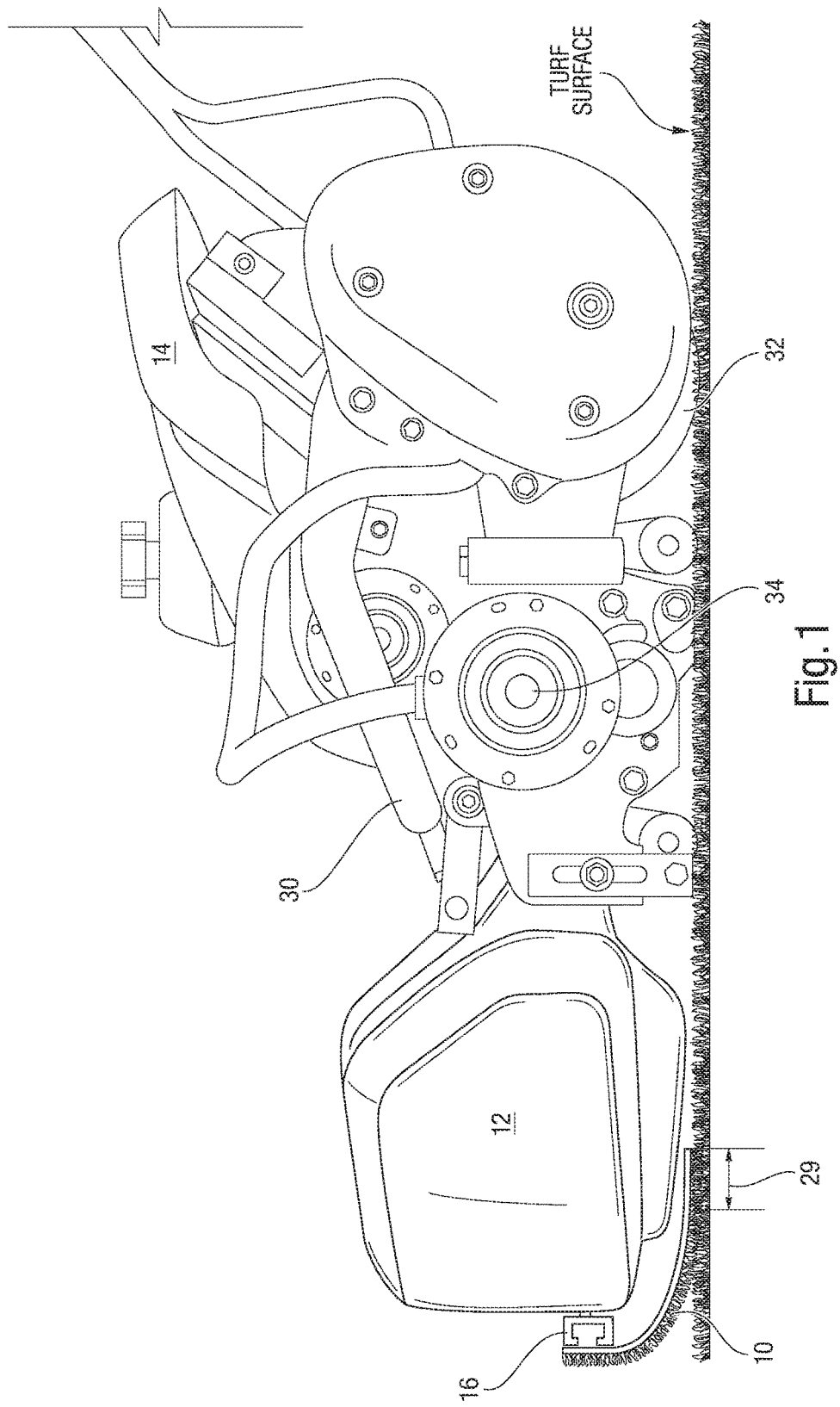
FIG. 1 is an elevation view of a preferred embodiment of the invention.
Figure 2:
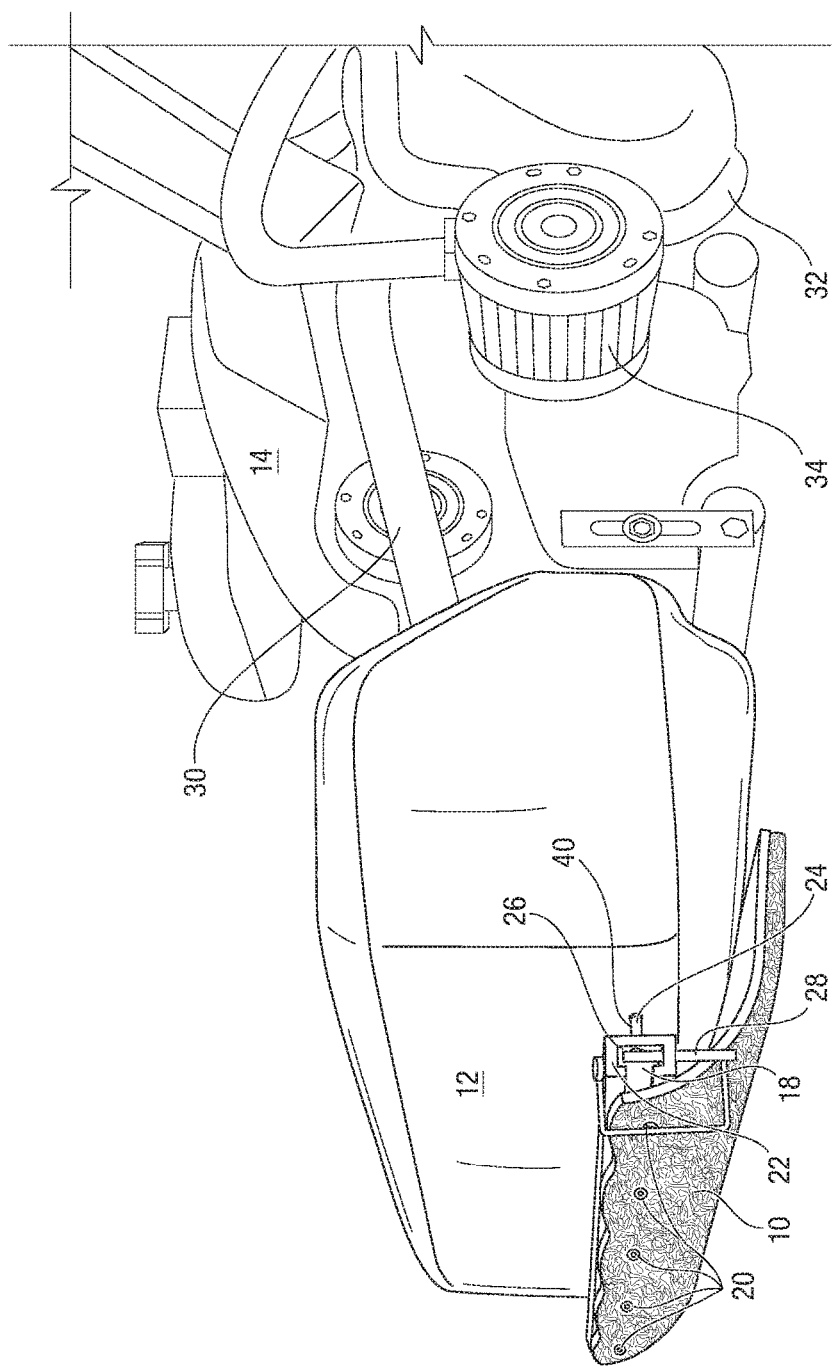
FIG. 2 is a perspective view of the embodiment of FIG. 1.
Figure 3:
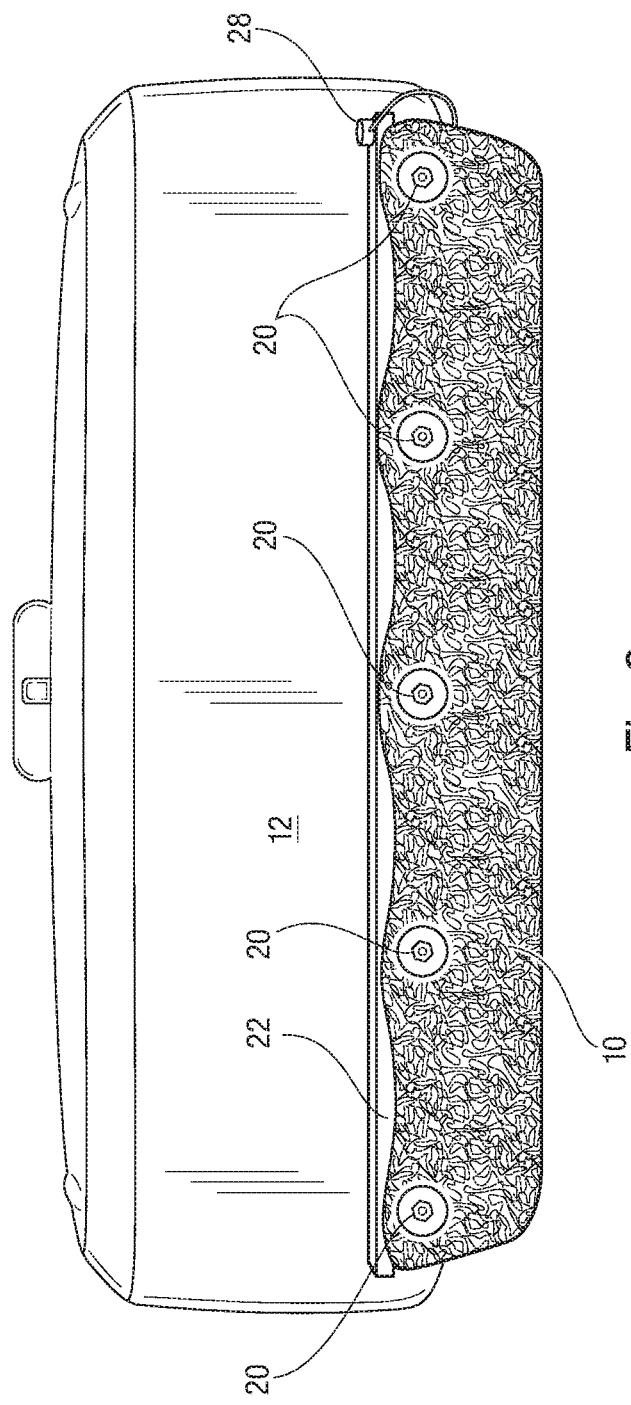
FIG. 3 is a front view of the embodiment of FIG. 1.

Referring to FIGS. 1, 2, and 3, a flexible mat 10 of the invention, for example, a section of artificial turf, for instance, a product known as Pro Ball Turf available from Synthetic Turf International, LLC, Jupiter, Fla., is shown mounted on grass catching receptacle 12 of a reel mower 14, illustrated, for example, as a John Deere 220 E cut Hybrid.

A mounting fixture 16 which will be further described in detail below facilitates easy attachment and removal of the mat and consists of a cross bar 18 to which the mat is mounted by a series of bolts 20, and a hollow cross bar receiving channel or bracket 22 permanently mounted on grass catching receptacle 12 by bolts 24. A slot 26 across the front of channel 22 allows the cross bar 18 mounting bolts free horizontal movement along the length of the channel allowing the mat and cross bar 18 to be slid into the channel and held in place by a stop bolt 27 at one end, as shown in FIG. 5, and a removable pin 28 at the opposite end.

For reference, additional components of mower 14 include frame 30, wheels or drum 32, and a powered rotatable cutting blade mechanism 34.

FIGS. 1, 2, and 3 all illustrate the flexibility of the mat and the height at which it is mounted on the mower in relation to the turf surface. This flexibility and positioning provide for the lower portion of the mat to be dragged over the turf as the mower is propelled forward. This results in the fibers of the mat commingling with the blades of the turf in region 29, as shown in FIG. 1, to lift them to a vertical orientation for uniform cutting.

Figure 4:
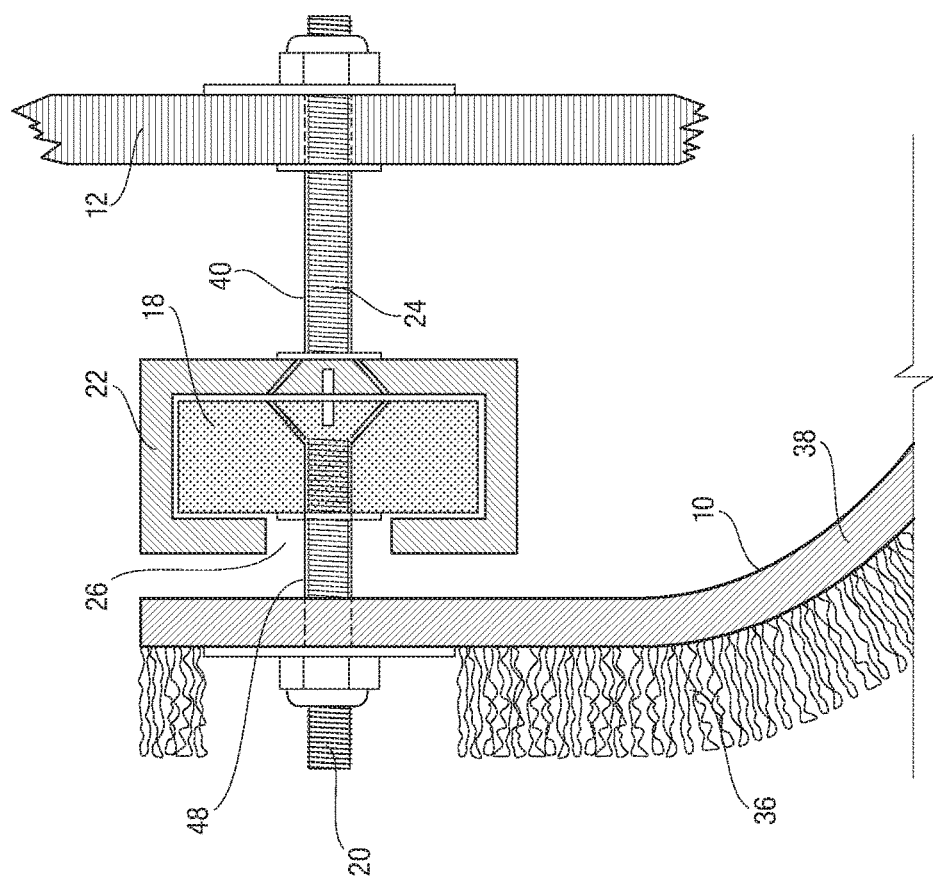
FIG. 4 is cross-sectional view of a component of the embodiment of FIG. 1.

FIGS. 4 and 5 illustrate in greater detail a feature of the invention showing a section of artificial turf or mat in which flexible fibers 36 disposed on flexible back 38 form an array of material highly suited to commingle with leaves of natural turf. Through experimentation and calculation, artificial turf having blades or leaves constituting a pile height of between one-quarter and one and one-half inches is most suitable in constructing the invention. Additional manufacturing characteristics which determine the density of the pile have been found to be in ranges as follows:

a face weight (weight of yarn in ounces per square yard) of between 22 and 48 ounces per square yard;

a machine gauge (width between stitch rows) of between one-quarter and three-eighths inches; and a stitch rate (number of stitches in a row within three inches) of between 18 and 22 per three inches.

FIGS. 4 and 5 are further directed to a means of attachment of the mat to a mower having a curved attachable surface as is the case for the mower with a curved grass catching receptacle as illustrated herein. Bushings 40 hold the side ends 42 and 44 of bracket 22 forward in alignment with the central portion 46. Similarly, bushings 48 are employed to space apart mat 10 and crossbar 18 to provide for the insertion and removal of bar 18 into channel 22. This allows the turf blade lifting assembly flexible mat and cross bar portion to be detached from the mower for replacement and for facilitating emptying the grass catching receptacle during a mowing operation.

The above description of the preferred embodiment may be modified within the scope of the claims as will be obvious to those skilled in the art. For example, a mat not comprising commercially available artificial turf could be constructed and substituted therefore. Also, alternative attachment mechanisms such as hook and eye arrangements could be designed to provide separation capability of the mat from the mower.

What is claimed is:

1. A turf blade lifting assembly for lifting turf, said turf comprised of a plurality of individual grass blades, for a mowing apparatus having a rotatable cutting blade, the width of said cutting blade defining a width of cut, said assembly comprising in combination:
   A. a flexible mat attachable to said mowing apparatus, said mat of a width approximately equal to the width of cut of said rotatable cutting blade, said mat comprised of a flexible back and a plurality of flexible fibers attached thereto, said fibers of a height between one-quarter and one and one-half inches, said fibers of a stiffness and distribution density configured to commingle with said grass blades of said turf, said mat having a weight to provide said comingling; and
   B. a mat attachment connection assembly for transversely attaching said mat to said mowing apparatus forward of said cutting blade at a height enabling a transverse portion of the fiber side of said mat to be dragged along the surface of said turf as said mowing apparatus is propelled forward during a mowing operation whereby said weight of said mat results in the comingling of said fibers and said turf grass blades thereby lifting said turf grass blades to an upright position for shearing by said cutting blade during the forward movement of said mowing apparatus.

2. The turf blade lifting assembly of claim 1 wherein said mat is comprised of artificial turf.

3. The turf blade lifting assembly of claim 2 wherein said artificial turf mat has
   A. a face weight of between 22 and 48 ounces per square yard;
   B. a machine gauge of between one-quarter and three-eighths inches; and
   C. a stitch rate of between 18 and 22 per three inches.

4. The turf blade lifting assembly of claim 1 wherein said mat attachment connection assembly is configured to enable removal of said mat from said mower apparatus.

5. The turf blade lifting assembly of claim 4 wherein said mat attachment connection assembly comprises
   A. a rectangular bar transversely attached to the top of and spaced apart from said mat;
   B. a rectangular channel member configured to be transversely secured to said mowing apparatus, said channel member having a slot in the forward face of said member for receiving said rectangular bar; and
   C. locking means for securing said bar within said channel member.

6. A mowing apparatus for sports playing field turf maintenance, said turf comprised of a plurality of individual grass blades, comprising:
   A. a frame;
   B. a rotational support attached to said frame for moving said apparatus over said turf;
   C. a powered rotatable cutting blade disposed on said frame, the width of said cutting blade defining a width of cut;
   D. a grass catching receptacle disposed forward of said cutting blade; and
   E. a turf blade lifting assembly attached to said grass catching receptacle, said assembly comprising in combination:
      i. a flexible mat, said mat of a width approximately equal to the width of cut of said rotatable cutting blade, said mat comprised of a flexible back and a plurality of flexible fibers attached, on one fiber side, thereto, said fibers of a height between one-quarter and one and one-half inches, said fibers of a stiffness and distribution density configured to commingle with said grass blades of said turf, said mat having a weight to provide said commingling; and
      ii. a mat attachment connection assembly for transversely attaching said mat to said receptacle at a height enabling a transverse portion of said fiber side of said mat to be dragged along the surface of said turf underneath said receptacle as said mowing apparatus is propelled forward during a maintenance operation whereby said weight of said mat results in the commingling of said fibers and said turf thereby lifting said turf grass blades to an upright position for shearing by said cutting blade.

7. The mowing apparatus of claim 6 wherein said mowing apparatus comprises a reel mower.

8. The turf blade lifting assembly of claim 6 wherein said mat is comprised of artificial turf.

9. The turf blade lifting assembly of claim 8 wherein said artificial turf mat has
   A. a face weight of between 22 and 48 ounces per square yard;
   B. a machine gauge of between one-quarter and three-eighths inches; and
   C. a stitch rate of between 18 and 22 per three inches.

10. The turf blade lifting assembly of claim 6 wherein said mat attachment connection assembly is configured to enable removal of said mat from said receptacle.

11. The turf blade lifting assembly of claim 10 wherein said mat attachment connection assembly comprises
    A. a rectangular bar transversely attached to the top of and spaced apart from said mat;
    B. a rectangular channel member configured to be transversely secured to said receptacle, said channel member having a slot in the forward face of said member for receiving said rectangular bar; and C, locking means for securing said bar within said channel.

12. A turf blade lifting method employable in sports field turf maintenance for lifting turf grass blades to an upright position prior to cutting with a mowing apparatus, said method comprising in combination:
  A. providing a mowing machine apparatus for sports playing field turf maintenance comprising:
    i. a frame;
    ii. a rotational support attached to said frame for moving said apparatus over said turf;
    iii. a powered rotatable cutting blade disposed on said frame a powered rotatable cutting blade disposed on said frame, the width of said cutting blade defining a width of cut; and
  B. providing a turf blade lifting assembly comprising:
    i. a flexible mat attachable to said mowing, apparatus, said mat of a width approximately equal to the width of cut of said rotatable cutting blade, said mat comprised of a flexible back and a plurality of flexible fibers attached thereto, said fibers configured of a height between one-quarter and one and one-half inches, said fibers of a stiffness and distribution density configured to commingle with the grass blades of said turf; and
    ii. a mat attachment connection assembly for transversely attaching said mat to said mowing apparatus forward of said blade;
  C. attaching said turf blade lifting assembly to said mowing apparatus forward of said cutting blade at a height enabling a transverse portion of the fiber side of said mat to be dragged along the surface of said turf as said mowing apparatus is propelled forward during a mowing operation; and
  D. Propelling said mowing apparatus forward to achieve the lifting of said turf grass blades.

13. The turf blade lifting method of claim 12 wherein said mat is comprised of artificial turf.

14. The turf blade lifting method of claim 13 wherein said artificial turf mat has
  A. a face weight of between 22 and 48 ounces per square yard;
  B. a machine gauge of between one-quarter and three-eights inches; and
  C. a stitch rate of between 18 and 22 per three inches.

15. The turf blade lifting method of claim 12 wherein said mat attachment connection assembly is configured to enable removal of said mat from said mowing apparatus.

16. The turf blade lifting method of claim 15 wherein said mowing apparatus includes a grass catching receptacle mounted on said frame forward of said cutting blade and said turf blade lifting assembly is attached thereto.

17. The turf blade lifting method of claim 15 wherein said mat attachment connection assembly comprises
  A. a rectangular bar transversely attached to the top of and spaced apart from said mat;
  B. a rectangular channel member configured to be transversely secured to said mowing apparatus, said channel member having a slot in the forward face of said member for receiving said rectangular bar; and
  C, locking means for securing said bar within said channel.

18. The mowing apparatus of claim 17 wherein said mowing apparatus comprises a reel mower.

\* \* \* \* \*